United States Patent [19]

Duyvesteyn et al.

[11] Patent Number: 5,236,491

[45] Date of Patent: Aug. 17, 1993

[54] BORON RECOVERY FROM GEOTHERMAL BRINES

[75] Inventors: Willem P. C. Duyvesteyn, San Jose; Manuel R. Lastra; Houyuan Liu, both of Sunnyvale, all of Calif.

[73] Assignee: BHP Minerals International Inc., Sunnyvale, Calif.

[21] Appl. No.: 967,811

[22] Filed: Oct. 28, 1992

[51] Int. Cl.$^5$ .............................................. G22B 3/42
[52] U.S. Cl. ...................................... 75/712; 75/725; 75/726; 423/276; 423/DIG. 19
[58] Field of Search ................. 75/712, 725, 726; 423/276, DIG. 19

[56] References Cited

U.S. PATENT DOCUMENTS 4,755,298 7/1988 Grinstead ............................ 210/902
4,778,597 10/1988 Bruzzi et al. ........................ 210/644

Primary Examiner—Melvyn J. Andrews
Attorney, Agent, or Firm—Kalil, Blaustein & Judlowe Hopgood, Calimafde

[57] ABSTRACT

Geothermal brines are passed through a bed of an anionic resin selective to the removal of boron while maintaining a pH value between about 4 to 5.5 to load the boron on the resin from which the boron is thereafter recovered. If the brine contains large quantities of constituents have Lewis acidities greater than boric acid, these constituents are preferably removed before the boron is recovered. The invention is particularly applicable to geothermal brines of temperature above ambient, e.g., 90° C. and above, such as 95° C. and above.

23 Claims, 5 Drawing Sheets

BORON RECOVERY FROM GEOTHERMAL BRINES

FIELD OF THE INVENTION

The present invention relates to the treatment of subterranean geothermal brines and more particularly to the recovery of boron from geothermal brines.

BACKGROUND OF THE INVENTION

Numerous patents and publications teach that boron can be extracted from aqueous solutions by anion exchange techniques. Anion exchange extractants for extracting boron from aqueous solutions are commercially available.

The treatment of geothermal brines to recover boron is complicated by the complex composition of the brine, including relatively low concentrations of boron, and by the temperature of the brine. These brines contain anions having Lewis acidities both greater and less than boric acid, which can make selective boron extraction difficult, if not impossible.

Geothermal brines are used as a heat source for the generation of electric power when brought to the earth surface and allowed to flash into steam which is passed through expansion turbines. However, even after passing through expansion turbines, the temperature of the brine is generally in excess of 90° C., e.g. 95° C. The relatively high temperature of these brines and the large volumes of brine involved preclude the use of liquid extractants for the recovery of boron therefrom. The high temperatures of the brines significantly increase the loss of organic solvents through evaporation and, possibly, through increased solubility in the brines. The large volumes of brine which must be treated increase losses of organic solvents through the mass action mechanism thereby increasing operating costs and environmental risks.

In the late seventies and early eighties the Department of Energy sponsored a number of R and D programs to investigate the generation of geothermal power from Imperial Valley resources in California. One of the programs included was a budget of $20 million or more to investigate the potential of producing power from a very deep brine field in the Southern section of the valley near Brawley which is called the Imperial Field. This resulted in the drilling of four wells in excess of 15,000 feet that were tested for an extended period of time. It appears that a CU-1 joint venture (a group interested in the production of electrical power from geothermal resources) responsible for the test program decided against the development of these deep resources because of various technical problems. One of the problems was associated with the formation of a heavy scale on the inside of the wellbore, which resulted in a premature decrease in the flow of brine. Although experience had been gained with solving scaling problems that occurred in shallower wells in the Northern section of the Valley, this scale had a different characteristic. The scaling was the result of the brine being supersaturated with lead and silver, with the CU-1 wellbore scales running about 80% lead and 10% silver.

Brine samples from these four wells showed zinc values that were 2 to 4 times higher than the ones experienced with existing geothermal brines from the Northern section of the Imperial valley. No further work was done to solve the scaling problem or the problem of metal recovery and the programs were discontinued.

The Imperial Valley of California presently supports about half a dozen geothermal power plants with a total installed generating capacity for 250 MW. At present, four more plants are under construction which will increase this capacity by an additional 150 MW.

An analytical comparison of flashed brines from the Imperial Field and the Salton Sea Field in parts per million is given below:

| Element, ppm | Imperial Field | Salton Sea Field |
|---|---|---|
| Gold | No | 0.2 |
| Silver | 2.6 | 0.5 |
| Zinc | 1500 | 500 |
| Lead | 650 | 110 |
| Lithium | 250 | 280 |
| Strontium | 1500 | 620 |
| Manganese | 1000 | 1200 |
| Platinum | NA | 0.06 |
| Sodium | 50,000 | 57,000 |
| Calcium | 18,000 | 26,000 |
| Potassium | 10,000 | 15,000 |
| Iron | 3,200 | 1,800 |
| Barium | 2,000 | 600 |
| Boron | 220 | 360 |
| Chloride | 131,000 | 160,000 |

As will be noted, the chemical composition of brines from both fields is essentially the same, except for zinc, lead and silver.

The Salton Sea Field exhibits high salinity at a relatively shallow depth and contains approximately 28% dissolved solids; whereas, the Imperial Field, compared to the Salton Sea Field, has higher salinity and has dissolved solids of approximately by weight 32% at greater depths.

Various methods have been proposed for treating geothermal brines. Particular reference is made to U.S. Pat. No. 4,624,704 by J. J. Byeseda which is directed to the selective recovery of zinc from metal containing brine, the disclosure of which is incorporated herein by reference.

As stated in this patent, geothermal brines are of particular interest in that they provide a source of power by virtue of the fact that hot geothermal pools are stored under great pressure beneath the earth surface and which when released to atmospheric pressure provide flash-steam for running a power plant. In addition, the geothermal brine contains metal values as stated hereinbefore, especially lead, silver and zinc, zinc being predominant of the three elements.

Up until the present time, no commercially viable process for recovering boron from geothermal brines has been available. Geothermal brines can be treated to recover other valuable minerals as disclosed in U.S. patent application Ser. No. 763,446, filed Sep. 19, 1991 and assigned to the present assignee, which application is incorporated herein by reference.

BRIEF DESCRIPTION OF THE INVENTION

Generally speaking, the present invention relates to the treatment of geothermal brines to recover boron. The brine at a temperature ranging from ambient and up to about 90° C. and higher, e.g. 95° C. and above, is maintained at a pH value between 4 and 5.5 and is contacted with a anionic resin selective to the extraction of boron to load the resin with boron and to recover at least about 80% of the boron contained in the brine. Advantageously, the brine is contacted with an anionic extractant to extract selectively anions having a Lewis acidity greater than boric acid to provide a first effluent at a temperature at least about ambient and rangin up to about 90° C. and higher, e.g. 95° C. or higher. Boron is eluted from the loaded resin with an aqueous solution of a mineral acid having an acidity between about 10 and 100 gpl to form an eluate enriched in boron. Boron can be recovered from the boron-enriched eluate by evaporation or further ion extraction processing.

DETAILED DESCRIPTION

Figure 1:
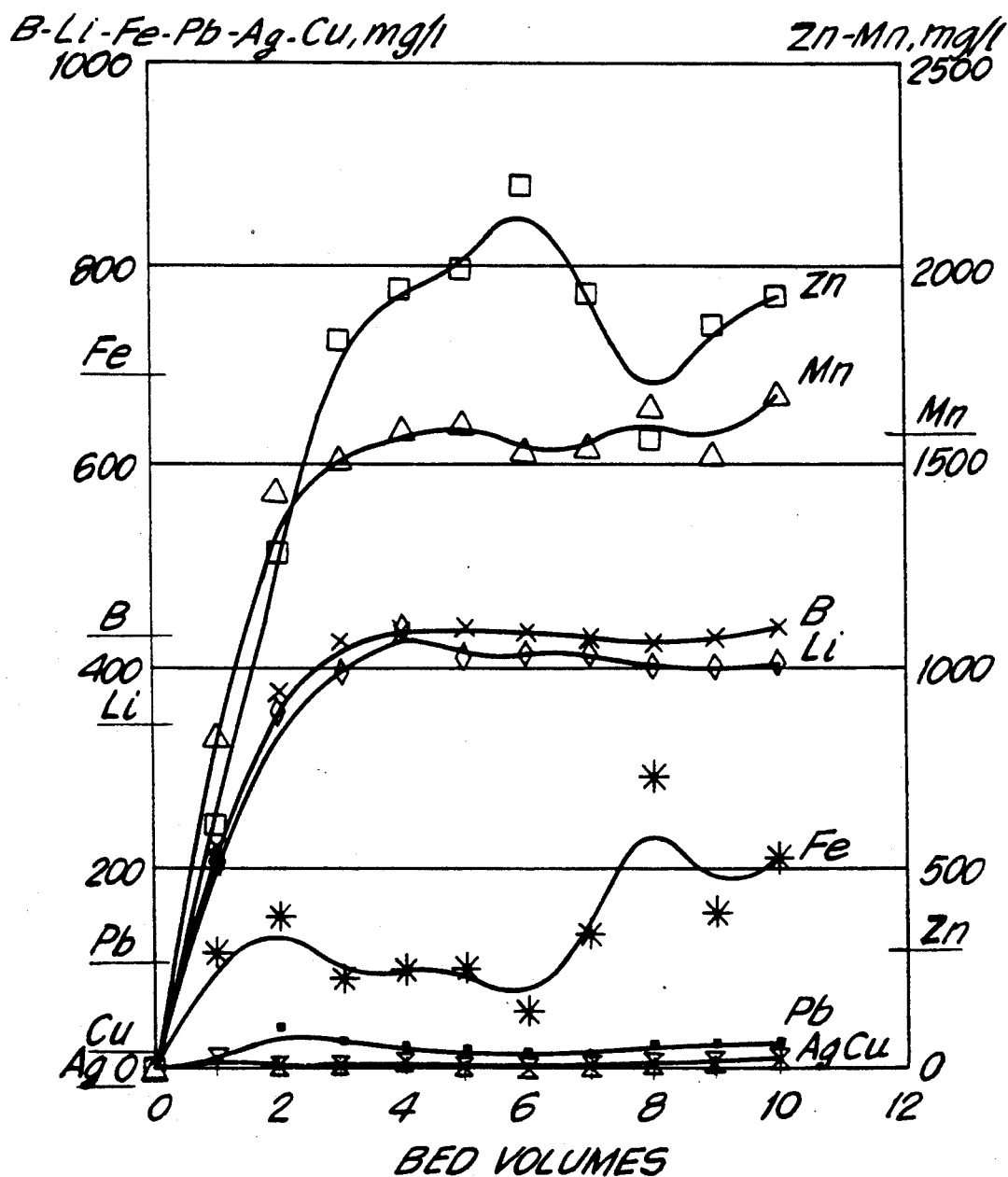
FIGS. 1 to 5 are graphs depicting the concentration of constituents in effluents and eluates versus the passage through a number of beds for removing the various constituents from the solution being treated.

Geothermal brines which can be treated in accordance with the present invention will generally be brines which upon being tapped from the ground are sufficiently hot to be used in conjunction with the generation of electric power. The brines are passed through low pressure expansion turbines and leave the expansion turbines at temperatures below their boiling point, which is dependent upon the geographic elevation of the location of the expansion turbine and upon the concentration of the minerals in the brine. In most instances, the geothermal brines will be at temperatures exceeding about 90° C., e.g. 95° C. Although the process in accordance with the present invention can be used in the absence of the generation of electric power, the generation of electric power makes the overall process more economical.

Geothermal brines containing at least about 100 parts per million (ppm), advantageously at least about 200 ppm boron, can be treated by the process in accordance with the present invention to recover at least about 80% of the boron and advantageously at least about 95%. The brines can also contain other valuable constituents such as zinc, lead, silver, copper, cadmium and lithium. The other valuable constituents when present will generally be present in the amounts shown below:

| Constituent | Amount, ppm |
| --- | --- |
| Zinc | 500–1500 |
| Lead | 100–700 |
| Silver | 0.2–3.0 |
| Copper | 1–10 |
| Cadmium | 1–10 |
| Lithium | 200–300 |

When the geothermal brines contain valuable constituents, other than boron, which form anionic complexes having Lewis acidities greater than boric acid, these constituents should be recovered from the brines prior to boron recovery. The acidic anionic complexes may interfere with boron recovery by loading on the ion exchange resin selective to the extraction of boron prior to the loading of boron, thereby lowering the overall capacity of the resin for boron extraction. This may particularly occur after repeated recycling of the resin, thereby producing boron-containing eluates contaminated with the more acidic anionic complexes. Contamination of the boron eluates ca be controlled by adjusting the pH value during elutriation of the boron-loaded resin.

For example, when the geothermal brines contain more than about 100 ppm, zinc, the brines can be initially processed for zinc recovery. Zinc containing geothermal brines can be treated in accordance with the process described in U.S. patent application Ser. No. 763,446, filed Sep. 19, 1991.

Other valuable constituents which form acidic anionic complexes which can be recovered before processing for boron recovery include lead, silver, copper and cadmium. If the concentration of the other valuable constituents is less than about 100 ppm, advantageously less than about 50 ppm the initial processing can be omitted. When the concentration of the other valuable constituents are sufficiently high to warrant separate recovery, ion exchange rather than solvent extraction processes are employed in order to minimize losses of organics to the brines and to the atmosphere, to minimize thermal degradation of the active organics, and to minimize the volume of liquids which must be handled. More noble valuable constituents, such as copper, lead and silver, can be recovered by well known processes such as cementation. The use of ion exchange resin processes for the recovery of valuables from geothermal brines permits the process to be conducted at temperatures in excess of 90° C. The ability to operate at such high temperatures is an important factor in the economics of the overall process because the costs associated with cooling enormous quantities of brine rapidly become prohibitive.

Boron-containing geothermal brines after pretreatment to remove anionic complexes more acidic than boric acid, if necessary, at temperatures about 90° C., are treated for boron recovery. The brines are passed through a column or columns containing an anionic exchange resin selective to the extraction of boron while the brines are maintained at a pH value of between about 4.0 and 5.5 to extract the boron from the brine. The resin loaded with boron is treated with an aqueous solution of a mineral acid to produce an enriched aqueous solution of boron from which boron can be recovered by crystallization or by further processing by ion exchange or solvent extraction.

The process in accordance with the present invention can also be used to treat brines at temperatures below about 90° C. but it is the recognition that boron can be recovered from brines at much higher temperatures than previously thought possible which provides the advantages of the present invention. The ability to recover boron by ion exchange processes at temperatures above 90° C. eliminate the need for cooling enormous volumes of brine to temperatures which were previously thought to be the maximum operating temperatures.

Resins selective to the extraction of boron are used rather than solvent extraction techniques. The use of resins minimize the loss of organic materials to the brines or to the atmosphere thereby minimizing both the operating costs and environmental concerns. Efficient operation of ion exchange resin processes require that the solution being treated be in contact with the resin sufficiently long to provide substantially complete removal of the desired ion while providing high and uniform throughput. The resin is generally placed in a tower and the liquid being treated is passed throughout with the resin being periodically removed to recover the desired ion and to generate the resin for recycling.

In the present invention care must be exercised to maintain the brine at a pH value between about 4 and 5.5 in order to avoid undue precipitation of other constituents in the highly mineralized brines. Significant precipitation of minerals during this stage of processing can clog the resin bed thereby producing non-uniform flow patterns and possibly incomplete boron recovery. The pH value of the brine should not fall much below about 4 because increasing acidities beyond this level impair the effectiveness of loading boron on the resin.

As stated hereinbefore, boron is extracted from geothermal brines with an anionic exchange resin selective to the extraction of boron. Examples of resins useful in the process in accordance with the present invention are IRA-743 (a registered trademark of Rohm & Haas) and WOFATIT MK51 (a trademark of Veb Chemiekombinat Bitterfeld). As an illustration, WOFATIT MK51 is a macroporous styrenedivinylbenzene copolymer with vicinal aliphatic hydroxyl groups as the active group. The choice of a particular matrix and active group is a matter of thermal stability, loading capacity, impurities present in the brines, physical stability and ease of stripping and regeneration. IRA-743 and WOFATIT MK51 provide boron loadings between about 1 to 3.5 mg boron per ml of resin depending upon flow rates and the impurities present in the brine.

Boron is recovered from the loaded resin by elutriation with an aqueous solution of a mineral acid. Hydrochloric or sulfuric acids are preferred due to ready availability and cost. The aqueous solution should have an acid concentration between about 10 and 100 gpl to insure substantially complete elutriation of boron to form boron-enriched solution containing between about 1 and 4 gpl boron. The concentration of the mineral acid in the aqueous solution is selected to provide maximum boron elutriation from the resin while minimizing elutriation of undesirable contaminants. The acidic solution for stripping boron from the loaded resin can be derived from process streams generated during the pretreatment of the brine to remove the constituents having Lewis acidities greater than boric acid. For example, if zinc is stripped from a loaded solvent or resin with a mineral acid and the resulting zinc chloride solution is treated with another extractant to produce a zinc depleted chloride solution as described in Ser. No. 763,446, the zinc depleted chloride solution which has the appropriate acid concentration can be used for elutriating boron. After repeated cycling of the resin, it is advantageous to regenerate the resin by washing with highly acid solution to remove accumulated contaminants which have Lewis acidities greater than boron acid.

The boron-enriched solution can be treated for boron recovery or for further purification and recovery. The boron-enriched solution can be heated to evaporate water and crystallize boric acid. Alternatively, the boron-enriched solution can be subjected to further extraction processing. At this stage either ion exchange resins or solvent extraction techniques, as known in the art, can be employed to further purify and concentrate the boron. The purified and concentrated solution can be sold as a solution or can be subjected to crystallization by evaporation to produce a solid product.

In order to provide a better understanding of the present invention the following illustrative example is given:

EXAMPLE I

Figure 2:
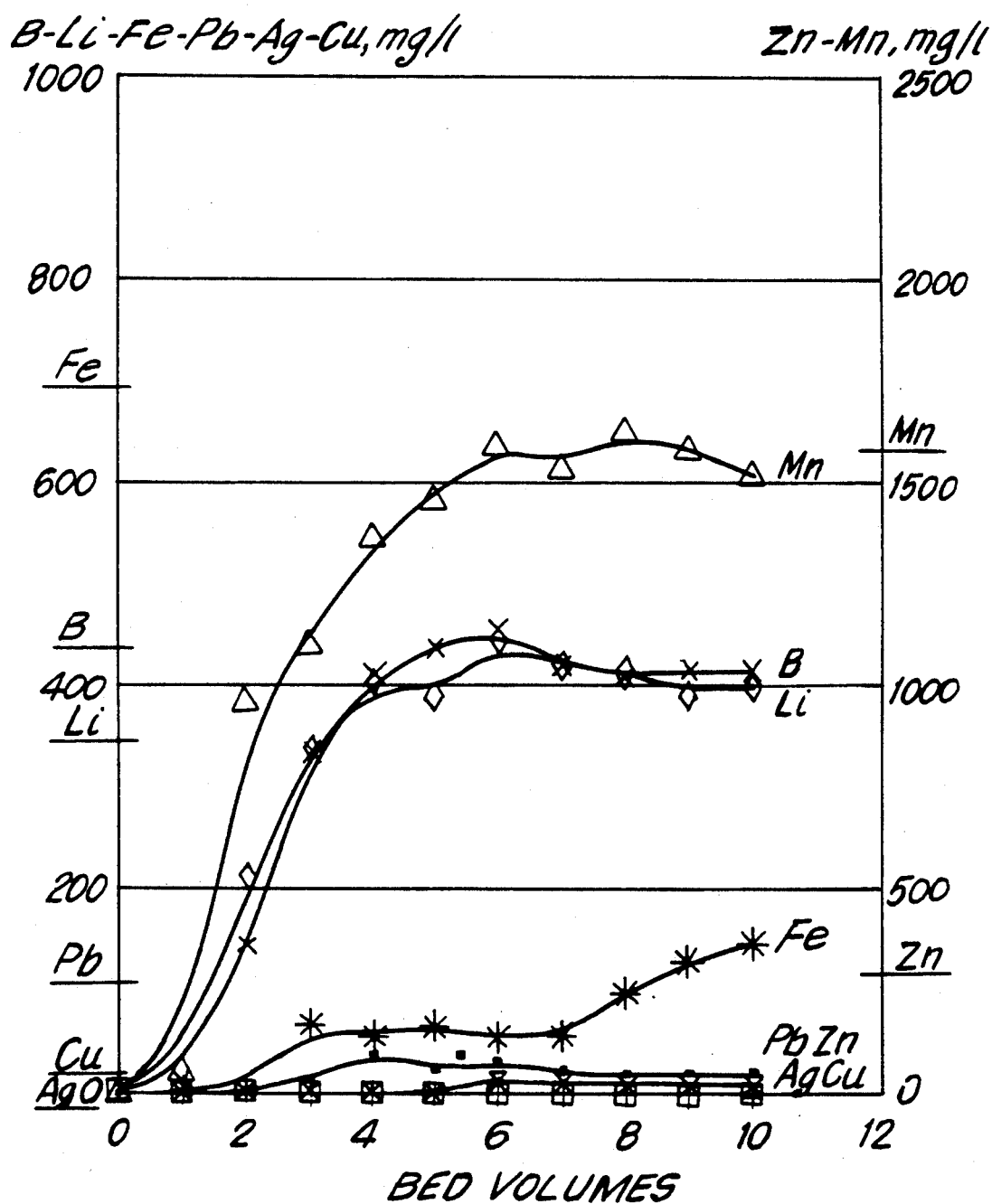
Figure 3:
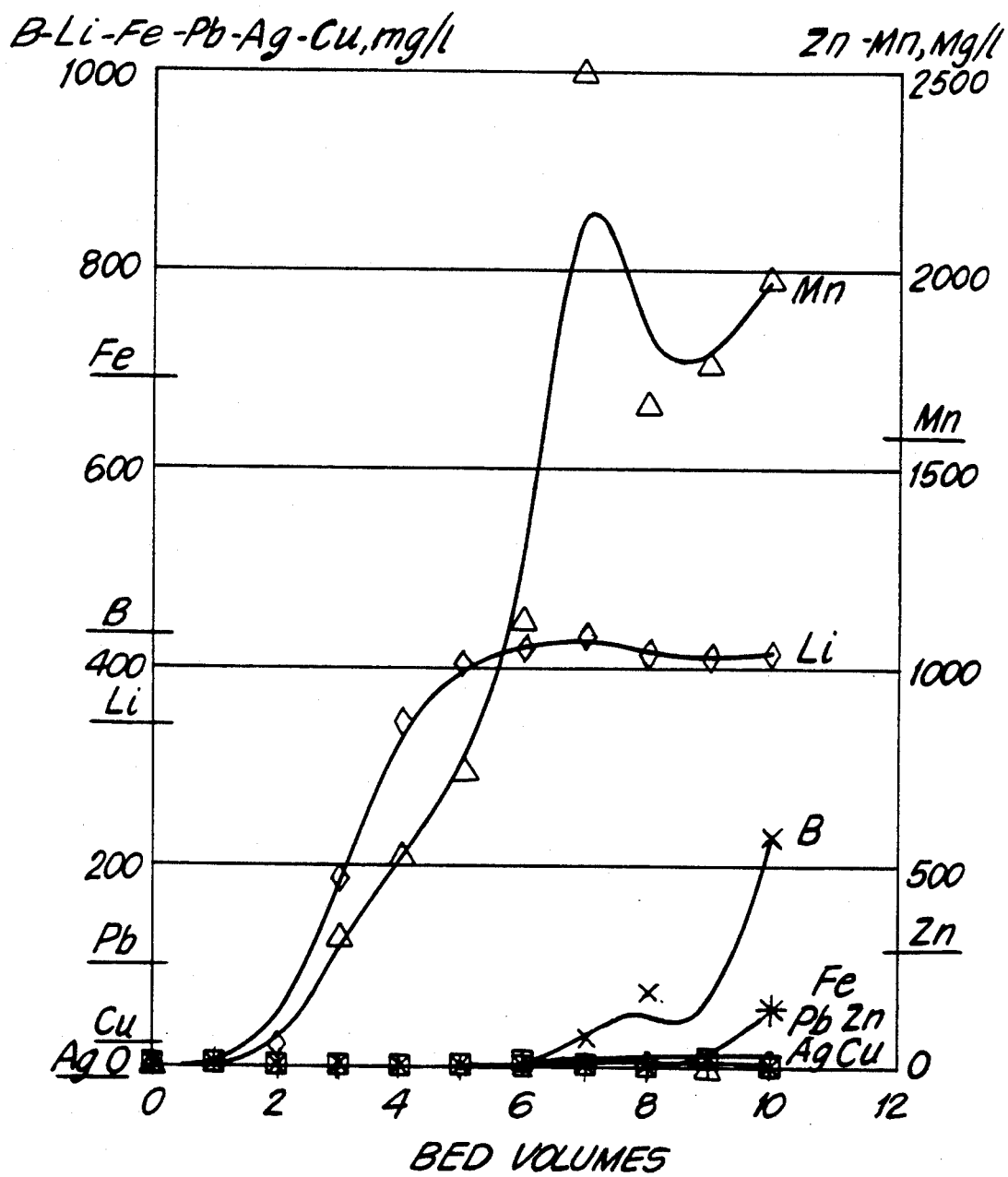
Figure 4:
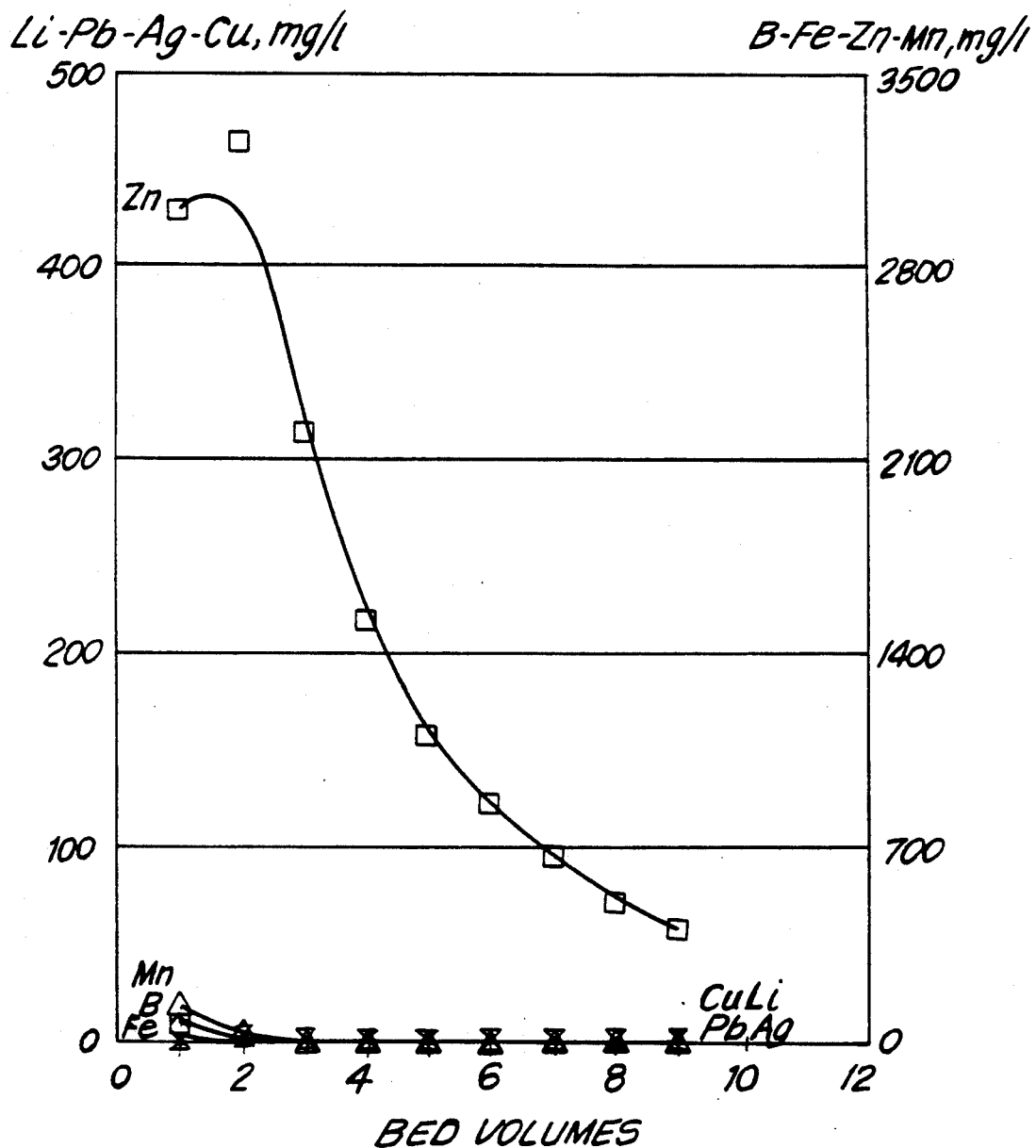

An Imperial Valley brine having a feed composition shown in Table I at a temperature of 99° C. was passed through three series of beds with each bed having a volume of 200 ml at a flow rate of 15 to 20 ml per minute under a nitrogen atmosphere. The solution emerging from each bed was sampled at time intervals which approximated a volume of the solution equivalent to the bed volume (i.e. 10 to 14 minute intervals) and the samples were then analyzed for the constituents shown in Tables I to III and FIGS. 1 to 3.

The first bed consisted of metallic zinc to remove copper, iron, lead and silver. The results shown in Table I and FIG. 1 show that more than about 90% of the copper, iron, lead and silver can be removed as long as the bed of zinc remains active, i.e. the cementation reaction does not proceed so far as to reach the unreacted zinc.

The effluent from the first series of beds, depleted in copper, iron, lead and silver was passed through the second series of beds which contained IRA-400 resin for zinc removal. Reference to Table II and FIG. II confirms that even after ten bed volumes of solution have passed through the bed of IRA-400 resin, the resin is still effective in removing zinc from solution. The results in Table II and FIG. II also show that lead, iron, boron, mangense, copper and lithium are initially removed from solution without significantly interfering with zinc removal.

The effluent from zinc removal was then passed through the third bed with IRA 743 resin. The pH of the zinc depleted solution was maintained at a value of about 5 to 6. The results presented in Table III and FIG. III show that all the constituents, except silver and copper, are initially removed without impairing boron recovery for the first six bed volumes. The results given in Table III and FIG. III suggest that more complete removal of lead, iron, manganese, copper and possibly lithium would allow greater volumes of brine to pass through the resin before the resin is treated for boron recovery.

The IRA 400 resin loaded with zinc from the passage of brine through the second bed was eluted with de-ionized water under the same conditions used for loading the resin. Table IV and FIG. IV show that initially greater amounts of iron, boron, manganese and lithium are eluted; but after passing about one bed volume of de-ionized water through the loaded resin, the eluate becomes highly enriched in zinc and impoverished in the constituents initially eluted.

Figure 5:
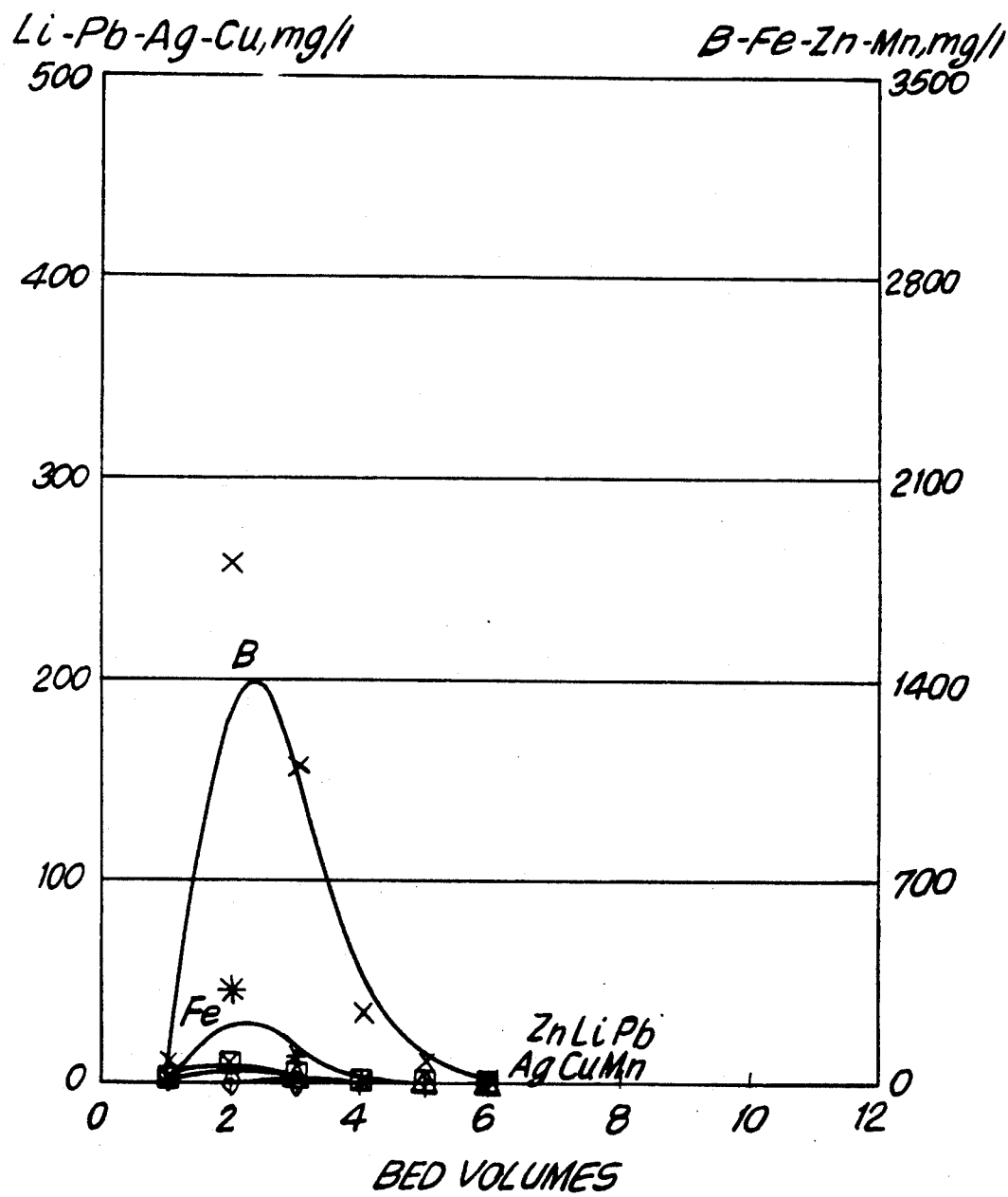

The IRA-743 resin loaded with boron from the third bed was eluted with de-ionized water and sulfuric acid and ammonium solutions to recover boron. The results are reported in Table IV and FIG. 5. The results show the initial washing with water can elute significant amounts of iron and manganese. However, it is clear from these tests that the boron elution is far more effective with acid solutions.

TABLE I

| Bed Volumes | ELEMENT CONCENTRATION, mg/liter | | | | | | | |
|---|---|---|---|---|---|---|---|---|
| | PB | Ag | Fe | Zn | B | Mn | Cu | Li |
| | | | | Feed | | | | |
| | 126.0 | 0.1 | 710.0 | 380.0 | 430.0 | 1590.0 | 9.8 | 370.0 |
| | In-Column Cementation with Zinc | | | | | | | |
| 0 | 0.0 | 0.0 | 0.0 | 0.0 | 0.0 | 0.0 | 0.0 | 0.0 |
| 1 | 7.5 | 0.1 | 112.0 | 605.0 | 220.0 | 825.0 | 9.9 | 205.0 |
| 2 | 38.9 | 0.1 | 150.0 | 1290.0 | 375.0 | 1430.0 | 1.0 | 355.0 |
| 3 | 25.6 | 0.1 | 88.2 | 1810.0 | 425.0 | 1510.0 | 1.0 | 395.0 |
| 4 | 19.9 | 0.1 | 96.9 | 1940.0 | 435.0 | 1580.0 | 4.3 | 440.0 |
| 5 | 18.7 | 0.5 | 97.8 | 1990.0 | 440.0 | 1600.0 | 1.0 | 410.0 |
| 6 | 12.7 | 0.1 | 57.1 | 2200.0 | 435.0 | 1530.0 | 1.0 | 415.0 |
| 7 | 13.6 | 0.1 | 134.0 | 1930.0 | 430.0 | 1540.0 | 3.7 | 415.0 |
| 8 | 23.5 | 0.1 | 290.0 | 1570.0 | 425.0 | 1640.0 | 3.8 | 400.0 |
| 9 | 21.6 | 0.1 | 156.0 | 1850.0 | 430.0 | 1520.0 | 5.5 | 400.0 |

TABLE I-continued

| | ELEMENT CONCENTRATION, mg/liter | | | | | | | |
|---|---|---|---|---|---|---|---|---|
| Bed | PB | Ag | Fe | Zn | B | Mn | Cu | Li |
| Volumes | | | | Feed | | | | |
| | 126.0 | 0.1 | 710.0 | 380.0 | 430.0 | 1590.0 | 9.8 | 370.0 |
| 10 | 24.7 | 0.1 | 210.0 | 1920.0 | 440.0 | 1670.0 | 8.7 | 405.0 |

TABLE II

| | ELEMENT CONCENTRATION, mg/liter | | | | | | | |
|---|---|---|---|---|---|---|---|---|
| | PB | Ag | Fe | Zn | B | Mn | Cu | Li |
| | Zn IX-IRA 400 (LOADING) | | | | | | | |
| 0 | 0.0 | 0.0 | 0.0 | 0.0 | 0.0 | 0.0 | 0.0 | 0.0 |
| 1 | 0.7 | 0.1 | 0.0 | 0.1 | 9.7 | 46.8 | 1.0 | 20.4 |
| 2 | 1.4 | 0.1 | 0.0 | 0.5 | 140.0 | 960.0 | 1.0 | 210.0 |
| 3 | 13.7 | 0.1 | 64.8 | 0.6 | 330.0 | 1100.0 | 1.0 | 335.0 |
| 4 | 38.2 | 0.1 | 53.2 | 1.2 | 410.0 | 1370.0 | 1.0 | 405.0 |
| 5 | 24.8 | 0.1 | 64.7 | 0.1 | 435.0 | 1460.0 | 1.0 | 390.0 |
| 6 | 30.0 | 0.1 | 52.1 | 0.8 | 455.0 | 1590.0 | 10.4 | 440.0 |
| 7 | 18.0 | 0.1 | 56.6 | 0.3 | 420.0 | 1540.0 | 13.4 | 420.0 |
| 8 | 18.8 | 0.1 | 97.0 | 0.5 | 410.0 | 1630.0 | 7.7 | 415.0 |
| 9 | 18.2 | 0.1 | 128.0 | 0.1 | 415.0 | 1580.0 | 8.5 | 390.0 |
| 10 | 19.0 | 0.1 | 145.0 | 0.1 | 415.0 | 1520.0 | 8.8 | 400.0 |

TABLE III

| | ELEMENT CONCENTRATION, mg/liter | | | | | | | |
|---|---|---|---|---|---|---|---|---|
| | PB | Ag | Fe | Zn | B | Mn | Cu | Li |
| | B IX-IRA 743 (LOADING) | | | | | | | |
| 0 | 0.0 | 0.0 | 0.0 | 0.0 | 0.0 | 0.0 | 0.0 | 0.0 |
| 1 | 0.1 | 0.1 | 1.0 | 0.1 | 0.1 | 0.2 | 1.0 | 1.0 |
| 2 | 0.1 | 0.1 | 1.0 | 0.1 | 0.1 | 1.6 | 1.0 | 19.9 |
| 3 | 0.1 | 0.1 | 1.0 | 0.1 | 0.1 | 320.0 | 1.0 | 188.0 |
| 4 | 0.1 | 0.1 | 1.0 | 0.2 | 0.1 | 525.0 | 1.0 | 345.0 |
| 5 | 1.6 | 0.1 | 1.0 | 2.9 | 0.1 | 740.0 | 1.0 | 405.0 |
| 6 | 3.5 | 0.1 | 1.0 | 14.8 | 0.7 | 1120.0 | 1.0 | 420.0 |
| 7 | 10.9 | 0.1 | 1.0 | 11.0 | 27.4 | 2500.0 | 1.9 | 435.0 |
| 8 | 11.7 | 0.1 | 1.0 | 8.3 | 74.0 | 1660.0 | 1.0 | 415.0 |
| 9 | 10.3 | 0.1 | 4.0 | 17.4 | 12.2 | 1760.0 | 1.0 | 410.0 |
| 10 | 13.5 | 0.1 | 58.0 | 7.5 | 230.0 | 1970.0 | 1.0 | 415.0 |

TABLE IV

| Bed | Gener. | ELEMENT CONCENTRATION, mg/liter | | | | | | | |
|---|---|---|---|---|---|---|---|---|---|
| Volumes | Soln. | PB | Ag | Fe | Zn | B | Mn | Cu | Li |
| | | Zn Elution-IRA 400 | | | | | | | |
| 1 | H2O | 1.3 | 0.1 | 94.3 | 46.1 | 400.0 | 1440.0 | 1.0 | 355.0 |
| 2 | | 0.1 | 0.1 | 22.0 | 3000.0 | 74.5 | 120.0 | 1.0 | 9.2 |
| 3 | | 0.1 | 0.1 | 1.0 | 3250.0 | 11.6 | 23.4 | 1.0 | 0.4 |
| 4 | | 0.1 | 0.1 | 1.0 | 2200.0 | 1.9 | 8.3 | 1.0 | 0.1 |
| 5 | | 0.1 | 0.1 | 1.0 | 1520.0 | 0.1 | 4.5 | 1.0 | 0.1 |
| 6 | | 0.1 | 0.1 | 1.0 | 1100.0 | 0.1 | 2.9 | 1.0 | 0.1 |
| 7 | | 0.1 | 0.1 | 1.0 | 860.0 | 0.1 | 2.5 | 1.0 | 0.1 |
| 8 | | 0.1 | 0.1 | 1.0 | 670.0 | 0.1 | 2.1 | 1.0 | 0.1 |
| 9 | | 0.2 | 0.1 | 1.0 | 500.0 | 0.1 | 1.9 | 1.0 | 0.1 |
| 10 | | 0.5 | 0.1 | 1.0 | 405.0 | 0.1 | 1.7 | 1.0 | 0.1 |

TABLE V

| Bed | Gener. | ELEMENT CONCENTRATION, mg/liter | | | | | | | |
|---|---|---|---|---|---|---|---|---|---|
| Volumes | Soln. | PB | Ag | Fe | Zn | B | Mn | Cu | Li |
| | | B Elution-IRA 743 | | | | | | | |
| 1 | H2O | 4.5 | 0.1 | 122.0 | 3.2 | 275.0 | 1980.0 | 1.0 | 375.0 |
| 1 | H2SO4 | 0.1 | 0.1 | 1.0 | 10.6 | 62.4 | 28.8 | 1.4 | 0.1 |
| 2 | | 0.1 | 0.1 | 320.0 | 64.5 | 1800.0 | 82.8 | 10.0 | 0.1 |
| 3 | | 4.2 | 0.1 | 89.1 | 20.4 | 1100.0 | 8.3 | 4.7 | 0.1 |
| 4 | | 1.4 | 0.1 | 3.9 | 0.1 | 240.0 | 1.1 | 1.0 | 0.1 |
| 5 | | 1.9 | 0.1 | 1.1 | 0.1 | 71.3 | 0.2 | 1.0 | 0.1 |
| 6 | | 1.3 | 0.1 | 1.0 | 0.1 | 24.1 | 0.2 | 1.0 | 0.1 |
| 1 | H2O | 1.2 | 0.1 | 1.0 | 0.1 | 9.8 | 0.2 | 1.0 | 0.1 |
| 05 | NH4OH | 0.4 | 0.1 | 1.0 | 0.1 | 0.1 | 0.1 | 1.0 | 0.1 |
| 1 | H2O | 0.1 | 0.1 | 1.0 | 0.1 | 0.1 | 0.1 | 1.0 | 0.1 |

Although the present invention has been described in conjunction with preferred embodiments, it is to be understood that modifications and variations may be resorted to without departing from the spirit and scope of the invention a those skilled in the art will readily understand. Such modifications and variations are considered to be within the purview and scope of the invention and the appended claims.

What is claimed is:

1. A process for recovering boron from boron-containing geothermal brines at a temperature of at least about ambient and above which comprises, contacting the geothermal brine with an anionic resin selective to the extraction of boron while maintaining the brine at a pH value between about 4.0 and 5.5 to load the resin with boron, eluting boron from the loaded resin with an aqueous solution of a mineral acid having an acidity between 10 and 100 gpl to form an eluate enriched in boron and treating the boron-enriched eluate to recover boron.

2. The process of claim 1, wherein the geothermal brine has a temperature of at least about 90° C.

3. The process as described in claim 1 wherein boron is recovered from the boron-enriched eluate by heating the eluate to evaporate water.

4. The process as described in claim 1 wherein the eluate enriched in boron is subjected to further ion in boron.

5. The process described in claim 1 wherein the boron-loaded resin is treated with an aqueous hydrochloric acid solution to elute boron therefrom.

6. The process as described in claim 1, wherein the geothermal brine contains zinc which is extracted by an anionic resin also selective to the extraction of boron, wherein zinc is eluted from the anionic extractant with water to provide a zinc chloride solution, wherein zinc is recovered from the chloride solution to provide a zinc-depleted solution, and wherein the zinc-depleted chloride solution after acidity adjustment is used to elute boron from the boron-loaded resin.

7. The process as described in claim 1 wherein at least about 80% of the boron is recovered from the brine.

8. The process as described in claim 7, wherein at least about 95% of the boron is recovered from the brine.

9. The process as described in claim 1, wherein the geothermal brine contains anions having Lewis acidities greater than boric acid and the geothermal brine is first contacted with an anionic extractant to selectively extract said anions.

10. The process as described in claim 1, wherein the geothermal brine is first treated with metallic zinc to cement ions more noble than zinc.

11. The process as described in claim 10, wherein the geothermal brine contains lead and the lead is cemented out with the metallic zinc.

12. The process as described in claim 10, wherein the geothermal brine contains copper and the copper is cemented out with the metallic zinc.

13. A process for recovering boron from boron-containing geothermal brines at a temperature of at least about ambient and above which comprises, contacting the geothermal brine with an anionic extractant to extract selectively anions having a Lewis acidity greater than boric acid to provide a first effluent while maintaining the pH value of said first effluent at between about 4.0 and 5.5, contacting the first effluent with an anionic resin selective to the extraction of boron to load the resin with boron and to remove at least about 80% of the boron from the brine, eluting boron from the loaded resin with an aqueous solution of a mineral acid having an acidity between 10 and 50 gpl to form an eluate enriched in boron, and treating the boron-enriched eluate to recover boron.

14. The process of claim 13, wherein the geothermal brine has a temperature of at least about 90° C.

15. The process as described in claim 13, wherein boron is recovered from the boron-enriched eluate by heating the eluate to evaporate water.

16. The process as described in claim 13, wherein the eluate enriched in boron is subjected to a further ion extraction and thereby provide a solution further enriched in boron.

17. The process described in claim 13, wherein the boron-loaded resin is treated with an aqueous hydrochloric acid solution to elute boron therefrom.

18. The process as described in claim 13, wherein the geothermal brine contains zinc, wherein zinc is eluted from the anionic extractant with water to provide a zinc chloride solution, wherein zinc is recovered from the chloride solution to form a zinc-depleted solution and wherein the zinc-depleted chloride solution after acidity adjustment is used to elute boron from the boron-loaded resin.

19. The process as described in claim 13, wherein at least about 95% of the boron is recovered from the brine.

20. The process as described in claim 13, wherein the geothermal brine contains anions having Lewis acidities greater than boric acid and the geothermal brine is first contacted with an anionic extractant to selectively extract said anions.

21. The process as described in claim 13, wherein the geothermal brine is first treated with metallic zinc to cement ions more noble than zinc.

22. The process as described in claim 13, wherein the geothermal brine contains lead and the lead is cemented out with the metallic zinc.

23. The process as described in claim 13, wherein the geothermal brine contains copper and the copper is cemented out with the metallic zinc.

* * * * *